United States Patent Office 3,238,242
Patented Mar. 1, 1966

3,238,242
PROCESS FOR THE PREPARATION OF PHENYL (META- AND PARA-TOLYL)-PROPIONITRILES
Kálmán Harśanyi, Dezsö Korbonits, Pál Kiss, László Tardos, and György Leszkovszky, Budapest, Hungary, assignors to Chinoin Gyógyszer-és Vegyészeti Termékek Gyara R.T., Budapest, Hungary, a firm
No Drawing. Filed Mar. 27, 1963, Ser. No. 268,458
Claims priority, application Hungary, May 24, 1962, CI 393
3 Claims. (Cl. 260—465)

This invention relates to new pharmaceuticals, intermediates and methods of preparing the same. More particularly it is concerned with new diphenyl-propionitriles, diphenyl-propylamines and derivatives of the same.

It is known that certain diphenyl-propylamine derivatives possess vasodilatory properties. The products of the present invention may be used in pharmacy on the basis of their enhanced or prolonged coronary dilatory effects.

The addition reaction between cinnamic acid and aromatic compounds was studied by a number of authors. Thus the addition reaction of cinnamic acid with benzene, toluene, anisole and mono-halogenated benzene-derivatives is known (J. Chem. Soc. 1952, 1817) to be accompanied by secondary reactions in some cases. Chlorobenzene is able to substitute the phenyl-group so that β,β-bis-(p-chlorophenyl)-propionic acid is obtained as a by-product. When using toluene no uniform product was achieved. The authors thus suggested that the position of the methyl group was indefinite, but their efforts in carrying out the reaction using stronger reaction conditions failed because the product became tarry. When reacting cinnamic acid with ethylbenzene, β-phenyl-β-(p-ethyl-phenyl)-propionic acid could be isolated [Annalen, 581 (1953), 149]. It is further known to react cinnamic acid nitrile with benzene using the Friedel-Crafts-method [Journ. Obshtshej Chimiji, 25 (1955), 286–293]. This process is carried out at the boiling point of benzene.

It has been found, according to the present invention, that compounds of the formula

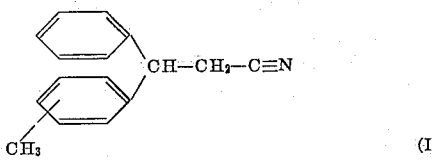
(I)

are valuable intermediates for the preparation of further chemicals possessing valuable therapeutical properties. It has been found further, that these compounds may be prepared by reacting cinnamic acid nitrile with toluene at a temperature above 90° C. in the presence of aluminum chloride.

The position of the methyl-group depends on the reaction conditions used during the Friedel-Crafts reaction and according to these conditions the corresponding o-, m- or p-product or mixtures thereof are obtained.

When reacting cinnamic acid nitrile with toluene in the presence of aluminum chloride being practically free of hydrochloric acid, β-phenyl-β-(m-tolyl)-propionitrile is obtained as a main product. When carrying out the reaction in the presence of aluminum chloride containing as much hydrochloric acid that strong fuming appears when the aluminum chloride is contracted with air, the main product is β-phenyl-β-(p-tolyl)-propionitrile.

Reaction of cinnamic acid nitrile and toluene is preferably carried out in the presence of 1–2 moles of aluminum chloride calculated on cinnamic acid nitrile. When using aluminum chloride being free of hydrochloric acid, the reaction mixture obtained is preferably worked up by pouring the same on aqueous hydrochloric acid and separating the layers. On evaporating of the solvent an oily product is obtained as a remainder containing in its greater part the m-substituted product.

When using aluminum chloride containing hydrochloric acid for the Friedel-Crafts reaction, the reaction mixture obtained is preferably worked up by pouring the same on aqueous hydrochloric acid, separating the layers, evaporating the solvent and subjecting the remainder to fractionation in vacuo. The o-substituted product is obtained in crystalline form which may be isolated by the usual methods.

The structure of these compounds is proved by their hydrolysis to acids, transformation of the acids thus obtained into the corresponding azides and by the infrared spectra of the products.

It has been found further, according to the present invention, that compounds of the formula

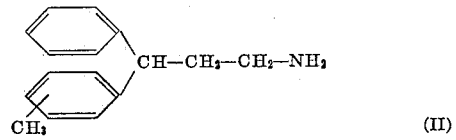
(II)

and their salts are valuable intermediates for preparation of therapeuticals besides showing therapeutical properties themselves.

These compounds may be prepared according to known methods by reducing compounds of formula I in the presence of substances having alkaline character. The reaction may be carried out by hydrogenating catalytically in the presence of a catalyst using high pressure. Organic solvents may be used for this reaction, e.g., alcohols.

The reaction may be carried out by way of reaction with nascent hydrogen, complex metal hydrides.

It has been found, according to the present invention, that this reaction may be performed in the presence of water using only but about 10 atm. pressure when Raney-nickel is used as catalyst and the reaction is carried out in the presence of about 10% ammonia calculated on the weight of the reaction mixture.

The primary amines may be transferred into their salts formed with mineral or organic acids e.g. the hydrochloric, hydrobromide, maleic acid etc. salts may be prepared.

It has been found, further, that compounds of the formula

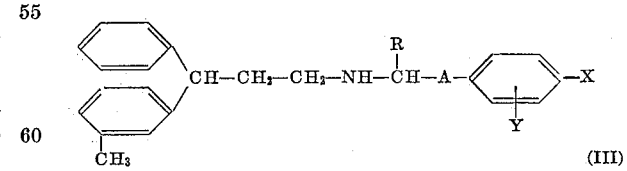
(III)

and its salts (where X stands for a member of the group consisting of hydrogen, hydroxyl- and alkoxy-group, Y stands for a member of the group hydrogen and alkoxy-group, R stands for a lower alkyl group and A stands for a member of the group consisting of valency-bound, methylene- and ethylene-group) and compounds of the formula

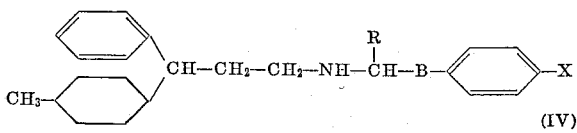

(where X stands for a member selected of the group consisting of hydrogen, hydroxyl and alkoxy-group, B stands for a member of the group consisting of valency-bound and ethylene-group and R stands for a lower alkyl group) and its salts are valuable pharmaceuticals which show enhanced or prolonged coronary dilatant activity.

These compounds may be prepared from the primary amines described above by condensation with the corresponding ketones. Condensation is carried out with reduction, preferably by means of hydrogen in the presence of a catalyst. Palladium, platinum or Raney-nickel may be used as catalysts. Hydrogenation may be carried out with nascent hydrogen by means of complex metal borohydrides, e.g., $NaBH_4$, $KBH_4$. One may proceed by carrying out reduction after condensation. It is preferable to carry out condensation using acetophenone, phenylacetone, benzylacetone, or their derivatives substituted with oxy or alkoxy groups, e.g., with p-oxybenzyl acetone, p-oxyphenyl acetone, p-methoxybenzyl acetone, etc.

As a consequenct of condensation with reduction, a second asymmetrical centrum is formed in the molecule and thus formation of a diastereomeric pair of compounds becomes possible. The two racemic compounds may be isolated from each other on the basis of their different physical properties. Thus they may be separated by way of formation of their salts, on the basis of the different solubility of said salts.

The diastereomeric salts are then subjected to salt formation with optically active acids whereupon resolvation may be accomplished based on the different solubility of the salts thus formed.

When used as pharmaceuticals, it is preferable to employ the compounds of Formula IV in the form of their salts formed with a mineral acid or an organic acid, or the free base may be set free from one of the salts formed on the course of preparation and it may be converted into an other salt convenient for therapeutical use. Thus salts with hydrochloric acid, sulphuric acid, phosphorus acid or organic acids, e.g., aliphatic acids, dicarboxylic acids, oxyacids may be formed.

The pharmaceutical compositions containing compounds of the Formula IV may contain additional compounds having themselves pharmaceutical activity. Thus the composition may contain as further active ingredients analgetics and vaso-dilators. Thus, e.g., nicotinic acid, citric acid, methyl homatropic bromide, menthol, phenolphthalein, hexamethylene tetramine, bilic acid, codein, amidazophen, novamidazophen, reserpine, phenobarbital or N - [(1) - phenyl-propyl-(2)]-1,1-diphenyl-propyl-(3)-amino-lactate, etc.

The said pharmaceutical compositions may be in form suitable for oral, rectal or parenteral use. The compositions may contain sweetening, flavouring, colouring and preserving agents. Compositions intended for oral use may be prepared according to any method known to the art for the manufacture of pharmaceutical compositions, such as tablets, dragées, suspensions, solutions, powders or granules, capsules, emulsions, etc. The tablets may contain non-toxic pharmaceutical excipients commonly used in the manufacture of tablets, thus they may contain lubricating, binding, granulating and disintegrating agents, diluents, etc.

Suspensions or solutions may contain the following excipients: suspending agents, dispersing or wetting agents, preservatives, thickening agents, etc. Powders and granules may contain wetting and suspending agents.

The pharmaceutical compositions may be in the form of suppositories. These compositions are prepared by mixing the active compounds with a suitable non-irritating excipient, such as cocoa-butter, or polyethylene-glycols.

The pharmaceutical compositions may be in the form of a sterile injectable preparation, such as an aqueous solution or suspension, or in another non-toxic parenterally acceptable diluent or solvent.

The compounds of Formula IV or their salts may be used for the treatment of humans preferably in 0.005 to 0.03 g. doses.

Further details of the invention are to be found in the examples.

Example 1

100.1 g. of anhydrous aluminum chloride, which does not fume on air during weighing, is added to the solution of 64.5 g. cinnamic acid nitrile in 420 ml. of dry toluene. The mixture is refluxed for two hours. After cooling the reaction mixture is poured into the mixture of 475 ml. of concentrated hydrochloric acid and 2380 ml. of water, whereupon the aqueous layer is separated from the toluene-layer and washed with 2 x 100 ml. of toluene. The united toluene extract is washed until free of acid and dried. The solvent is distilled off and the residual oil is fractionated in vacuo. Thus 104 g. of β-phenyl-β-tolyl-propionitrile are obtained boiling at 174–176° C. (0.8 Hg mm.). The product contains ortho, metha and para isomers; this being proved by the infrared spectra, containing the following characteristic bands in the range of 700–800 cm.$^{-1}$: 820 (p-derivative), 787 (m-derivative), 735 (o-derivative). The main product is β-phenyl-β-(m-tolyl)-propionitrile.

Analysis: C%=86.88, H%=7.41 (theory: C%=86.84, H%=6.83).

Example 2

Using the same starting materials, and method as described in Example 1, 105 g. of β-phenyl-β-tolyl-propionitrile are obtained, when the reaction time amounts to 5 hours. The composition of the product is similar to that of the product of Example 1, it contains ortho, metha and para isomers, but β-phenyl-β-(m-tolyl)-propionitrile is present in a larger quantity. 20 g. of the product are boiled for 12 hours with a previously prepared mixture of 24 ml. of concentrated sulphuric acid and 33 ml. of water. The reaction product is poured into 100 ml. of water and filtered. The precipitate is washed several times with water, dissolved in the solution of 10 g. of sodium carbonate in 230 ml. of water, treated with charcoal, filtered and acidified with 5 N hydrochloric acid. Thus 18.11 g. of β-phenyl-β-(m-tolyl)-propionic acid are obtained. M.P.:107–112° C.

Analysis: C%=79.97, H%=6.71. (Theory: C%=79.79, H%=6.78.)

Example 3

129 g. of cinnamic acid nitrile and 840 ml. of dry toluene are boiled for 2 hours in the presence of 202 g. of aluminum chloride, containing hydrochloric acid (which fumes strongly on air). After cooling the reaction mixture is poured into the mixture of hydrochloric acid and water, according to the method as described in Example 1. The layers are separated, the toluene layer is evaporated whereupon the residue is subjected to fractionation. Cinnamic acid nitrile is recovered in the forerun whereupon 108 g. of a high boiling oily product are collected; the latter partly crystallizing on standing.

400 ml. of petrol are poured to 81.32 g. of the crude, partly crystalline product, whereupon the mixture is stirred at room temperature and filtered. Thus 45.65 g. of crystalline β-phenyl-β-(p-tolyl)-propionitrile are obtained. M.P.: 57–60° C. On recrystallization from 80 percent ethanol the melting point increases to 64–65° C. respectively.

Analysis: C%=86.88, H%=6.98, N%=6.54. (Theory: C%=86.64, H%=6.83, N%=6.33.)

2.0 g. of α-phenyl-β-(p-tolyl)-propionitrile are hydrolysed with the mixture of 2.4 ml. of concentrated sulphuric acid and 3.3 ml. of distilled water. Thus 2.07 g. of β-phenyl-β-(p-tolyl)-propionic acid are obtained, M.P.=144° C. On recrystallization from 80 percent ethanol the melting point increases to 145–146° C.

Example 4

95.25 g. of β-phenyl-β-tolyl-propionitrile prepared according to the method described in Example 1 are hydrogenated in 600 ml. of ammoniacal alcohol (ammonia content: 15%, water content less than 20%) in the presence of 17 g. of Raney nickel catalyst, at the pressure of 13 atm., and a temperature of 50–60° C. for 12 hours. The catalyst is filtered, the solvent distilled off and the residue fractionated in vacuo. 91.70 g. of γ-phenyl-α-(m-tolyl)-propylamine are obtained as main product; boiling point: 159–160° C./0.3 Hg. mm.

5.0 g. of the distilled base are dissolved in 10 ml. of alcohol and 2.6 g. of maleic acid are added. On addition of 60 ml. of ether, 4.78 g. of γ-phenyl-γ-(m-tolyl)-propylamine hydrogen maleate are obtained, M.P.: 104° C. The product is to be recrystallized from ethyl acetate.

Analysis: C%=70.15, H%=6.85, N%=3.97. (Theory: C%=70.36, H%=6.79, N%=4.10.)

Example 5

71.20 g. of β-phenyl-β-(p-tolyl)-propionitrile (M.P.= 57–60° C.) are hydrogenated in 500 ml. of ammoniacal alcohol in the presence of 20 g. of Raney-nickel as a catalyst, according to the method described in Example 4. After filtration of the catalyst, the solution is evaporated and the product distilled in vacuo. Thus 66.92 g. of γ-phenyl-γ-(p-tolyl)-propylamine are obtained as main product, B.P.=157–159° C./0.6 Hg. mm.

1.56 g. of maleic acid are added to 3.0 g. of γ-phenyl-γ-(p-tolyl)-propylamine in 6 ml. of anhydrous ethanol. Thus γ-phenyl-γ-(tolyl)-propylamine hydrogen maleate are obtained, M.P.: 143° C. On recrystallization from water, or ethyl acetate the melting point increases to 146° C.

Analysis: C%=70.26, H%=6.66, N%=4.17. (Theory: C%=70.36, H%=6.79, N%=4.10.)

The hydrochloric acid salt of the product may be prepared in the similar way. M.P.=182° C.

Analysis: C%=73.32, H%=7.32. (Theory: C%=73.4, H%=7.70.)

Example 6

22.50 g. of γ-phenyl-γ-tolyl-propylamine (containing mainly the metha isomer) are hydrogenated in the presence of 13.4 g. of methyl-benzyl-ketone and palladium as a catalyst, in 230 ml. of methanol, at 50–60° C. at a pressure of 8 atm. The catalyst is filtered off, the solvent is evaporated and the residue fractionated. Thus 29.80 g. of the condensed product are obtained, B.P.: 195° C. 0.1 Hg/mm.

The hydrogen maleate of N-[1-phenyl-propyl-(2)]-1-phenyl-1-(m-tolyl)-propyl-(3)-amine melts at 139–140° C.

Analysis: C%=75.52, 75.60; H%=7.07, 6.75; N%=3.04. (Theory: C%=75.79, H%=7.24, N%=3.05.)

The characteristic bonds of metha-disubstituted benzene are found at 784 cm.$^{-1}$ in the infrared spectra of the compound.

The toxicity of the above salt when administered as intraperitioneal suspension was found to be $DL_{50}$=195 mg./kg.

The coronary dilatant effect was examined on dogs according to the following method: after opening the chest of the animal a Moravitz cannula was introduced into the sinus coronarius through the right auricle. The blood of the sinus was introduced into the right vena femoralis through a rotameter measuring the sinus outflow. Blood pressure was measured according to the usual method by means of a mercury manometer in the arteria femoralis. The product was administered intravenously. The vagi of the neck were cut.

Compared with the known coronary dilator "Segontin" the above salt shows the following differences of effect: assuming the original resistance to be 100 percent, the decreased resistance was found to be 73% (in the case of Segontin 76.5%) and 63.5% (in the case of Segontin 70%) when administering doses of 1 or 2 mg., respectively. Duration of the effect was found to be 15 to 30 minutes (in the case of Segontin, 6 minutes).

In numerous tests the product exhibited adrenaline-like effects, which could be observed by the increase of the flow, due to the increase of heart work. This effect can also be the result of the reserpine-like noradrenaline mobilisation.

Example 7

19.40 g. of γ-phenyl-γ-tolyl-propylamine (containing mainly the metha isomer) are hydrogenated with 12.78 g. of benzyl acetone in 230 ml. of methanol, at 56–60° C., at 8 atm. pressure, in the presence of palladium-charcoal as a catalyst. The reaction mixture is filtered, whereupon the residue is fractionated after evaporating the solvent. 24.40 g. of the main fraction are obtained at 215–218° C./0.2 Hg mm.

The N-[1-phenyl-butyl-(3)]-1-phenyl-1-(m-tolyl)-propyl-(3)-amine hydrogen maleate is prepared from 23.58 g. of the base with 8.60 g. of maleic acid in 66 ml. of anhydrous ethanol. On addition of 370 ml. of ether 24.83 g. of the salt are precipitated, M.P.: 123–124° C. The salt may be recrystallized from carbon tetrachloride.

Analysis: C%=76.24, 75.82; H%=7.41, 7.30. (Theory: C%=76.08, H%=7.45.

Example 8

22.50 g. of γ-phenyl-γ-tolyl-propyl-amine (containing mainly the metha isomer) and 12.01 g. of acetophenone are hydrogenated in 100 ml. of methanol in the presence of palladium-charcoal as a catalyst, whereupon 32.79 g. of distillation residue are obtained.

98.5 g. moles of anhydrous ethanol and 81.3 ml. of concentrated aqueous hydrochloric acid are added to the crude base. On standing in a refrigerator 9.6 g. of the hydrochloric acid salt are obtained as I. generation, melting at 156–159° C., clearing up at 164° C. From the mother-liquor further 7.59 g. of the salt are to be filtered on standing, melting at 143–147° C., but clearing up only at 157° C.

On recrystallization from ethyl acetate the melting point of the N-[1-phenyl-ethyl-(1)]-1-phenyl-1-(m-tolyl)-propyl-3-amine-hydrochloride increases to 168–170° C., but the recrystallization causes significant loss of weight. Analysis of the hydrochloric acid salt: C%=78.73; 78.62; 79.25; H%=7.85; 7.53; 7.82; N%=3.77; 3.84; (theory: C%=79.03, H%=7.96, N%=3.69).

The toxicity of the above salt on mice if administered intravenously was found to be $DL_{50}$=23 mg./kg. When tested for coronary dilatory effect on rats it was found, that the product compensates the coronary constrictor effect of Vasopressine. The $ED_{50}$ value amounts to 4 mg./kg. (in the case of Segontin, 7.5 mg./kg.). On cats narcotized with urethane the product causes 40 Hg mm. blood pressure decrease, when administered in the dose of 0.5 mg./kg. On isolated intestines it proved to be a spasmolytic, equivalent to papaverine.

When tested on coronary dilatory effect on dogs it has been found, that the flow-resistance decreases to 73.5% when applied in doses of 1 mg./kg. and to 68.5% when applied in doses of 2 mg./kg. Duration of the effect amounts to 15–20 minutes. There was observed a reserpine-like noradrenaline mobilisation.

Example 9

16.88 g. of γ-phenyl-γ-tolyl-propyl-amine (containing mainly the metha isomer) and 12.30 g. of p-hydroxybenzyl acetone are hydrogenated in 200 ml. of methanol in the presence of palladium-charcoal as a catalyst, according to the method described in the previous examples. 27.38 g. of distillation residue are obtained, from which 26.50 g. are used for the formation of the hydrochloric acid salt. The crude base is dissolved in 50 ml. of anhydrous ethanol while warming. On addition of 30 ml. of anhydrous ethanol containing hydrochloric acid and ether 20.03 g. of N-[1-(4-hydroxy-phenyl)-butyl-(3)]-1-phenyl-1-(m-tolyl)-propyl-3-amine hydrochloride are precipitated. M.P.=184–186° C. The product can be recrystallized from a mixture of 80% of ethyl acetate and 20% of anhydrous ethanol. M.P.=189–191° C.

*Analysis:* C%=76.17; 76.47; H%=7.94; 8.06. (Theory: C%=76.16; H%=7.87.)

The coronary dilatory effect of the salt on rats was found to be $ED_{50}$=5 mg./kg., if administered intravenously. On isolated intestines it proved to be a spasmolytic equivalent to papaverine.

Example 10

22.50 g. of γ-phenyl-γ-(p-tolyl)-propylamine and 16.4 g. of p-hydroxy-benzyl acetone are hydrogenated in 400 ml. of methanol according to the method as described previously. After filtration of the catalyst 35.97 g. of crude distillation residue are obtained.

5 g. of crude N-[1-(4-hydroxy-phenyl)-butyl-(3)]-1-phenyl-1-(p-tolyl)-propyl-3-amine are dissolved in 15 ml. of 96 percent ethanol and on addition of 10 ml. of concentrated hydrochloric acid the hydrochloric acid salt is precipitated. Thus 4.02 g. of N-[1-(4-hydroxy-phenyl)-butyl-(3)]-1-phenyl-1-(p-tolyl)-propyl-3-amine hydrochloride are obtained, M.P.=197–200° C. On recrystallization from a mixture containing 1 part of ethyl acetate and 1 part of ethanol, the melting-point increases to 200–202° C.

*Analysis:* C%=76.38; H%=7.81. (Theory: C%=76.16; H%=7.87.)

30.50 g. of crude N-[1-(4-hydroxy-phenyl)-butyl-(3)]-1-phenyl-1-(p-tolyl)-propyl-(3)-amine base are dissolved in 70 ml. of 96 percent warm ethanol. On cooling the base (12.67 g.) precipitates partly in the form of crystals. M.P.=143–147° C. On recrystallization from ethyl acetate the melting point increases to 152° C.

*Analysis:* C%=83.27; H%=8.01; (theory: C%=83.60; H%=8.37).

On evaporation of the mother-liquor of the base 17.75 g. of the base can be recovered. The base is dissolved in 40 ml. of 96 percent alcohol and 15 ml. of concentrated hydrochloric acid are added. 7.96 g. of the salt precipitates, M.P.=210–214° C. On recrystallization from anhydrous alcohol the melting-point of the racemic N-[1-(4-hydroxy-phenyl)-butyl-(3)]-1-phenyl-1-(p-tolyl)-propyl-3-amine hydrochloride ("A"-racemate) increases to 218° C.

*Analysis:* C%=76.20; H%=7.42; (theory: C%=76.16; H%=7.87).

4.0 g. of the precipitated, crystalline base are suspended in 20 ml. of alcohol, 5 ml. of concentrated hydrochloric acid are added and the product is dissolved while heating to boiling. Thus 4.11 g. of the racemic N-[1-(4-hydroxy-phenyl)-butyl-(3)]-1-phenyl-1-(p-tolyl)-propyl-3-amine hydrochloride ("B"-racemate) are obtained, M.P.: 207–209° C. On recrystallization from 96 percent ethanol the melting point increases to 210–212° C.

*Analysis:* C%=76.43; H%=8.02; (theory: C%=76.16, H%=7.87).

The melting point of the mixture of the A and B racemates, was found to 204–206° C.

Example 11

21.77 g. of γ-phenyl-γ-(p-tolyl)-propylamine and 11.61 g. of acetophenone are hydrogenated in 400 ml. of methanol, according to the process as described in Example 10. After evaporation crude N-[1-phenyl-ethyl-(1)]-1-phenyl-1-(p-tolyl)-propyl-3-amine is obtained.

The base is dissolved in 70 ml. of anhydrous alcohol, containing 5 percent of hydrochloric acid. On addition of 100 ml. of ether 7.17 g. of the hydrochloric acid salt are precipitated (M.P.: 154–157° C.). The product can be recrystallized from ethyl acetate, containing 5 percent of alcohol.

The melting point of racemic N-[1-phenyl-ethyl-(1)]-1-phenyl-1-(p-tolyl)-propyl-(3)-amine hydrochloride ("A" racemate) was found to be 157–159° C.

*Analysis:* C%=79.05; H%=7.92; (theory: C%=78.77; H%=7.72).

After evaporating the motor-liquor a residue weighing 24.5 g. is obtained, which crystallizes on digesting with 50 ml. of ethyl acetate. The weight of the product amounts to 9.56 g. Its melting point is very protracted, the greatest part melts between 140–155° C. On recrystallization from the mixture of 10 percent ethanol and water the melting point (2.15 g.) amounts to 183–189° C. On recrystallization from the mixture of 20 percent ethanol and water the melting point (1.84 g.) did not increase. On recrystallization from anhydrous ethanol the melting point of the racemate (1.21 g.) increases to 191–192° C., thus N-[1-phenyl-ethyl-(1)]-1-phenyl-1-(p-tolyl)-propyl-(3)-amine hydrochloride is obtained. ("B" racemate.)

*Analysis:* C%=78.53; H%=7.85; (theory: C%=78.77, H%=7.71).

Example 12

The following composition exhibiting a coronary dilatory effect is prepared according to the usual finishing methods:

|  | G. |
|---|---|
| N-[1-phenyl-propyl-(2)]-1-phenyl-1-(m-tolyl)-propyl-(3)-amine hydrogen maleate | 0.015 |
| $CaHPO_4 \cdot 2H_2O$ | 0.055 |
| Ethyl cellulose | 0.002 |
| Amylum solani | 0.025 |
| Talcum | 0.002 |
| Magnesium stearate pro tablet | 0.001 |

What we claim is:

1. A process for the preparation of compounds of the formula

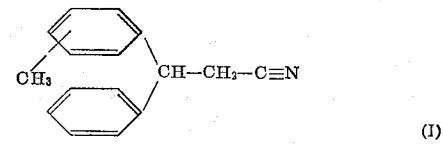

(I)

which comprises reacting cinnamic acid nitrile with toluene at a temperature above 90° C. in the presence of aluminium chloride selected from the group consisting of aluminium chloride being practically free of hydrochloric acid and aluminium chloride which contains as much hydrochloric acid that strong fuming occurs when the aluminium chloride is contacted with air.

2. A process for the preparation of β-phenyl-β-(m-tolyl)-propionitrile, comprising reacting cinnamic acid nitrile with toluene at a temperature above 90° C. in the presence of aluminium chloride being practically free of hydrochloric acid.

3. A process for the preparation of β-phenyl-β-(p-tolyl)-propionitrile comprising reacting cinnamic acid nitrile with toluene at a temperature above 90° C. in the presence of aluminium chloride which contains as much hydrochloric acid that strong fuming occurs when the aluminium chloride is contacted with air.

(References on following page)

References Cited by the Examiner

UNITED STATES PATENTS

| | | |
|---|---|---|
| 2,045,574 | 6/1936 | Adkins et al. |
| 2,185,969 | 1/1940 | Schultze _____ 167—65 |
| 2,220,331 | 11/1940 | Hilgermann et al. ____ 167—65 |
| 2,326,222 | 8/1943 | Hopff et al. _____ 260—465 |
| 2,419,327 | 4/1947 | Wachter et al. ___ 260—570.8 X |
| 2,443,246 | 6/1948 | Homeyer et al. _____ 260—465 |
| 2,483,381 | 9/1949 | Goldberg et al. _____ 260—501 |
| 2,543,271 | 2/1951 | Banbas et al. _____ 260—501 |
| 2,668,857 | 2/1954 | Veldstra et al. _____ 260—570 |
| 2,670,375 | 2/1954 | Stoughton _____ 260—570 |
| 3,069,457 | 12/1962 | Lynn et al. _____ 260—465 |

OTHER REFERENCES

Grebenyuk et al., "Chemical Abstracts," 1956, vol. 50, page 1639.

CHARLES B. PARKER, *Primary Examiner.*

DALE R. MAHANAND, *Assistant Examiner.*